(12) United States Patent
Lipniarski

(10) Patent No.: US 6,190,600 B1
(45) Date of Patent: Feb. 20, 2001

(54) CIRCULAR INTERCONNECT

(75) Inventor: David J. Lipniarski, N. Tonawanda, NY (US)

(73) Assignee: Confer Plastics, Inc., N. Tonawanda, NY (US)

( * ) Notice: Under 35 U.S.C. 154(b), the term of this patent shall be extended for 0 days.

(21) Appl. No.: 09/267,458

(22) Filed: Mar. 12, 1999

(51) Int. Cl.[7] ..................................................... B29B 7/20
(52) U.S. Cl. ........................... 264/318; 264/334; 425/438; 425/441; 425/468; 425/556; 425/577; 425/DIG. 58
(58) Field of Search .................................. 425/438, 441, 425/468, 556, 577, DIG. 58; 249/101; 264/299, 318, 334

(56) References Cited

U.S. PATENT DOCUMENTS

| | | | |
|---|---|---|---|
| 1,911,539 | 5/1933 | Walter | 249/99 |
| 3,759,043 | 9/1973 | Tokunaga | 61/4 |
| 5,013,508 | 5/1991 | Troester | 264/224 |
| 5,024,796 | 6/1991 | Iwasa | 264/69 |
| 5,251,560 | 10/1993 | Ban et al. | 114/266 |
| 5,536,111 | 7/1996 | Doernemann | 405/16 |
| 5,788,911 | * 8/1998 | Nomura et al. | 264/318 |

* cited by examiner

Primary Examiner—Harold Pyon
Assistant Examiner—Donald Heckenberg

(74) Attorney, Agent, or Firm—Hodgson, Russ, Andrews, Woods & Goodyear LLP

(57) ABSTRACT

The present invention relates to an apparatus that forms a polymeric structure. The apparatus has a mold plate, a circular trench, a male and female interconnect, a vertical gap filler, and a cylinder. The mold plate has a predetermined geometric design. The circular trench is in the mold plate and the difference between the outer diameter and the inner diameter of the circular trench is a distance D. The male interconnect and the female interconnect are interspaced between each other. Each interconnect rotates within the circular trench and has a base and an interconnection portion. Each base has a width D and slidably mates to the mold plate. Each interconnect portion has a minimum width W which is less than D. The male interconnect portion protrudes downwards relatively from its base to a distance P, likewise the female interconnect portion protrudes upwards relatively from its base to a distance P. The vertical gap filler aligns with the circular trench and has a foundation and an extension. The extension has a width greater than W, a height greater than 2P, and protrudes upwards and downwards from its foundation. The cylinder rotates each interconnect to a predetermined position and raises the vertical gap filler so the foundation connects to the mold plate before any polymeric material is applied to the apparatus to form the polymeric structure. Once the polymeric structure is formed, the cylinder lowers the vertical gap filler until the extension is below the mold plate a distance greater than P and rotates each interconnect so the polymeric structure can be removed from the apparatus.

16 Claims, 3 Drawing Sheets

CIRCULAR INTERCONNECT

FIELD OF THE INVENTION

The present invention relates to an apparatus to form a polymeric structure having male and female interlocking joints on one side of the structure, and process to manufacture the same.

BACKGROUND OF THE INVENTION

Walter, in U.S. Pat. No. 1,911,539, Doernemann, in U.S. Pat. No. 5,536,111, Troester, in U.S. Pat. No. 5,0133,508, and Tokunaga, in U.S. Pat. No. 3,759,043, all disclose a three-dimensional polymeric structure having a male and a female interlocking component. Not one of these disclosures has both interlocking components on a single side of the structure. Moreover, these references disclose both interlocking components contacting the edges of the sides, which allows easier forces to separate the components. As such, none of these references discloses an apparatus that forms at least a male and a female interlocking component on a single side, and preferably not contacting an edge of the side, of the structure. The present invention solves this problem.

SUMMARY OF THE INVENTION

The present invention relates to an apparatus that forms a polymeric structure. The apparatus has a mold plate, a circular trench, a male and female interconnect, a vertical gap filler, and a cylinder. The mold plate has a predetermined geometric design. The circular trench is in the mold plate and the difference between the outer diameter and the inner diameter of the circular trench is a distance D. The male interconnect and the female interconnect are interspaced between each other. Each interconnect rotates within the circular trench and has a base and an interconnection portion. Each base has a minimum width D and slidably mates to the mold plate. The male interconnect portion protrudes downwards relatively from its base to a distance P. In contrast, the female interconnect portion protrudes upwards relatively from its base to a distance P. The vertical gap filler aligns with the circular trench and has a foundation and an extension. The extension has a width greater than W, a height greater than 2P, and protrudes upwards and downwards from its foundation. The cylinder rotates each interconnect to a predetermined position and raises the vertical gap filler so the foundation connects to the mold plate before any polymeric material is applied to the apparatus to form the polymeric structure. Once the polymeric structure is formed, the cylinder lowers the vertical gap filler until the extension is below the mold plate a distance greater than P and rotates each interconnect so the polymeric structure can be removed from the apparatus.

DETAILED DESCRIPTION OF THE PRESENT INVENTION

Figure 1:
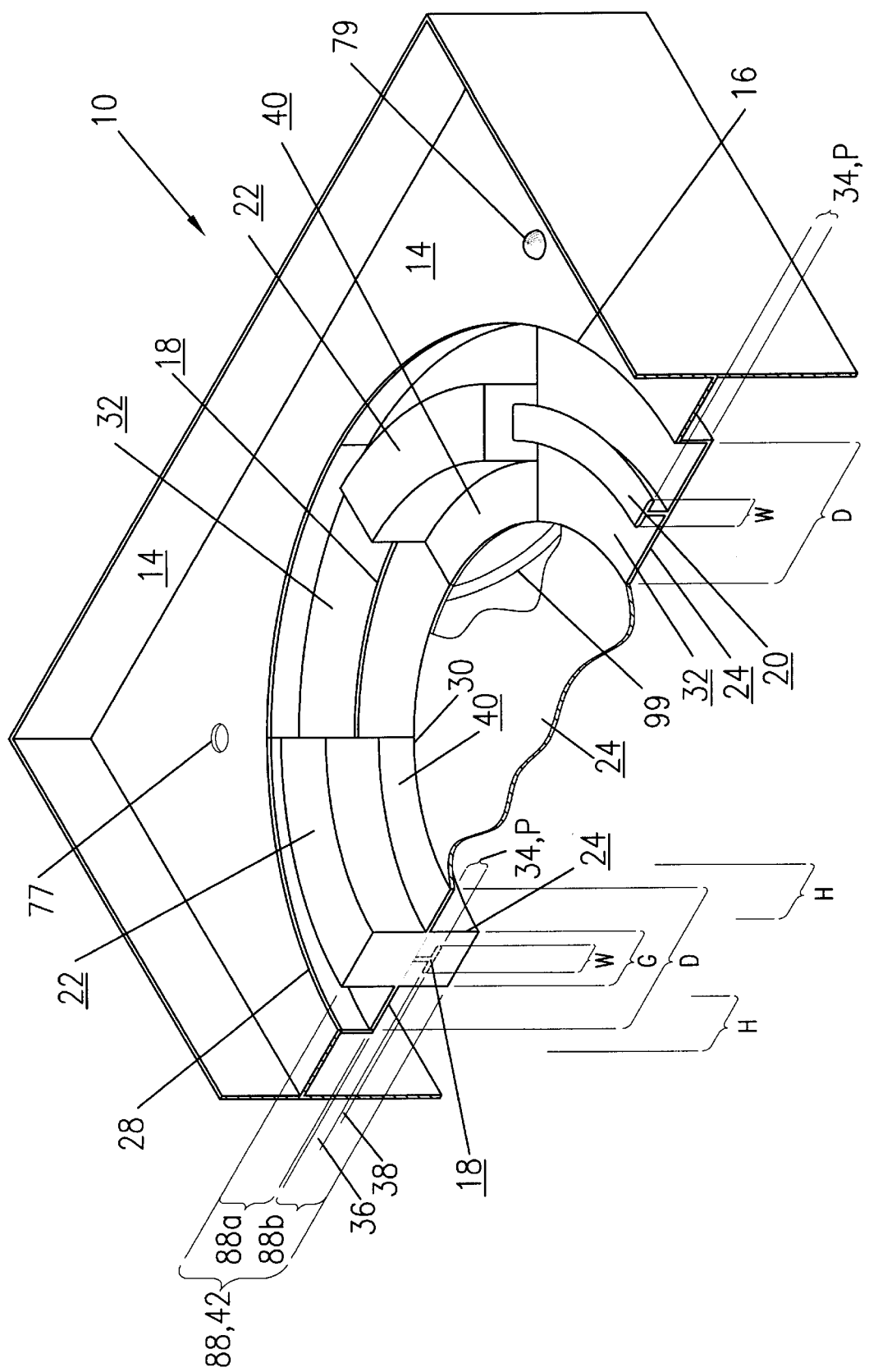
FIG. 1 is a cross-sectional view of the apparatus from a first position.
Figure 2:
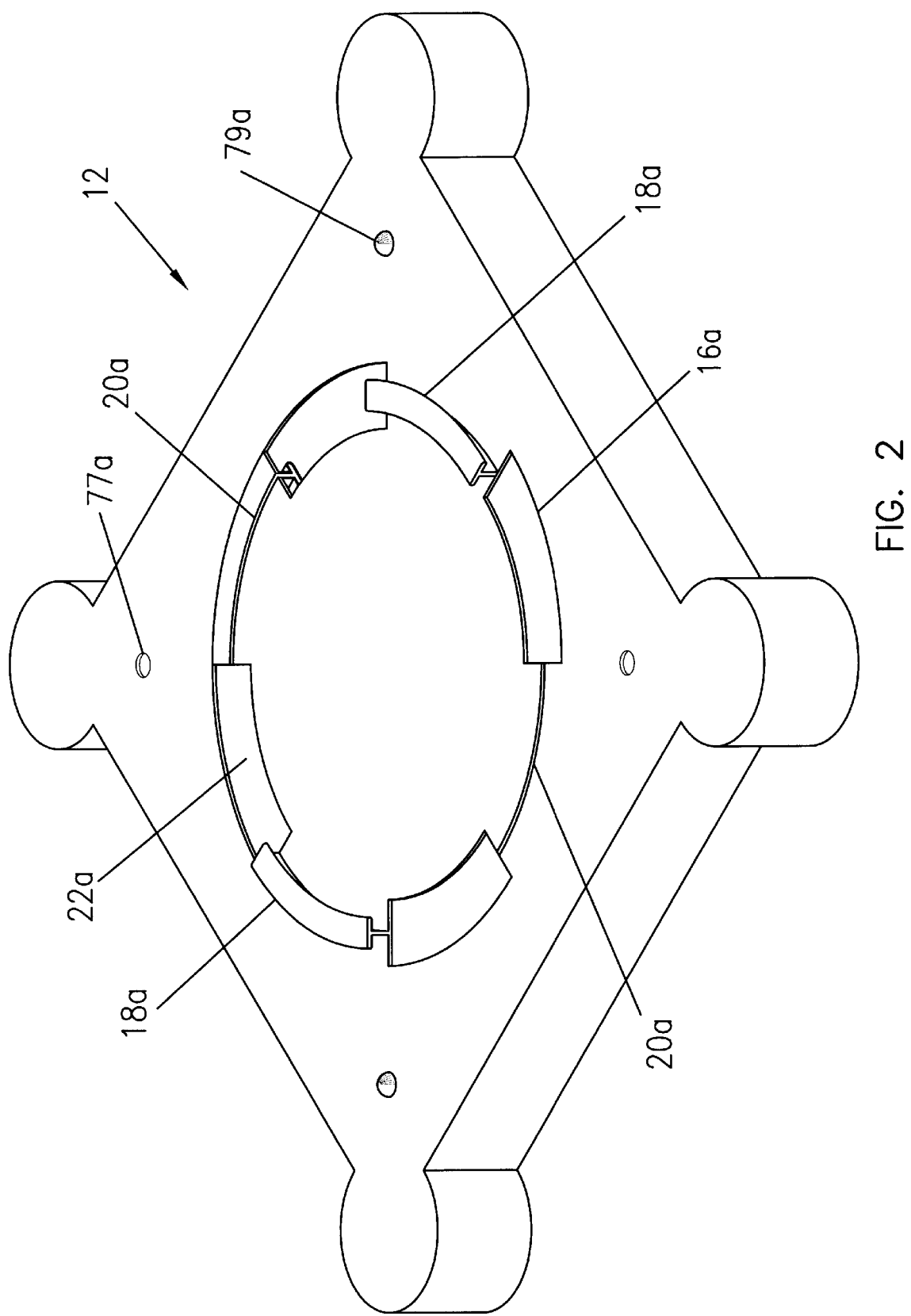
FIG. 2 is an isometric view of the polymeric structure.
Figure 3:
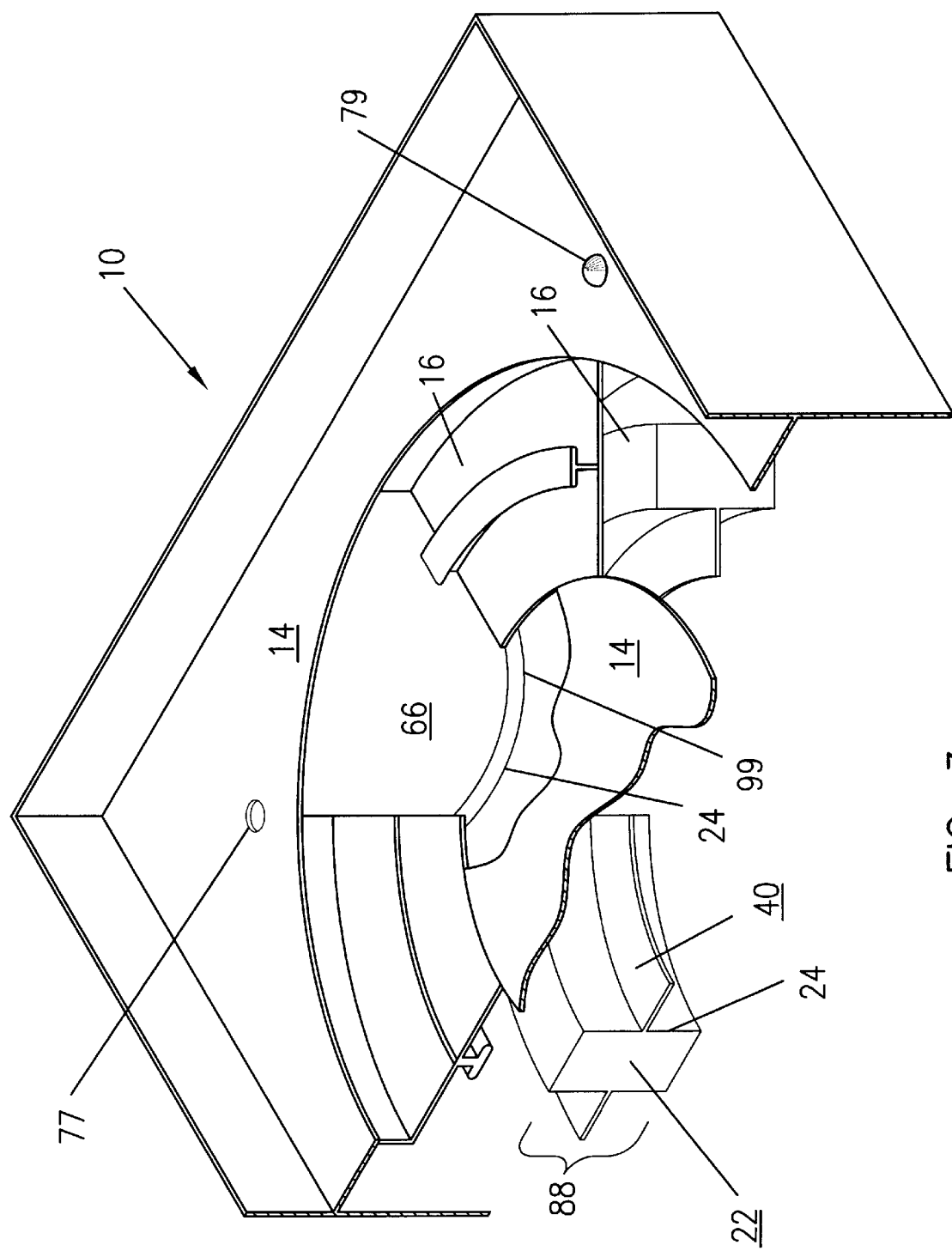
FIG. 3 is a cross-sectional view of the apparatus from a second position.

The present invention relates to an apparatus 10, shown in FIGS. 1 and 3, that forms a polymeric structure 12, a representative sample is shown in FIG. 2. Returning to FIG. 1, the apparatus 10 has a mold plate 14, a circular trench 16, a male interconnect 18, a female interconnect 20, a vertical gap filler 22, and a cylinder 24. Likewise, the structure 12, turning to FIG. 2, has a corresponding circular trench 16a, male interconnect 18a, and female interconnect 20a. This design allows a first structure 12 interconnect with a second structure 12. Initially, the circular trench 16a of each structure 12 receives the male interconnects of the other structure 12. The user then rotates each structure or just one structure so each female interconnect 20a receives and locks onto each male interconnect 18a. This interconnection system ensures each structure will not separate from the other structure by mere horizontal or vertical forces.

Returning to FIG. 1, the mold plate 14 has a predetermined geometric design which determines the shape of the structure 12. As such, this design can be any shape. A requirement to the design is that the circular trench 16 must fit on one side of the structure 12.

The circular trench 16 is in the mold plate 14 and has two diameters, an outer diameter 28 and an inner diameter 30. The difference between the outer diameter 28 and the inner diameter 30 is a distance D. The distance D can be any predetermined distance. The distance D is such that the trench 16 receives the male and female interconnects 18, 20, and vertical gap fillers 22.

The male interconnect 18 and the female interconnect 20 are interspaced between each other. This spacing ranges between thirty and one hundred eighty degrees. Preferably, the spacing is forty-five to ninety degrees.

Each interconnect 18, 20 rotates within the circular trench 16. Preferably, each interconnect 18, 20 connects to other interconnects 18, 20 by supports 99. Thus, when one interconnect 18, 20 rotates, all other interconnects 18, 20 rotate as well. Each interconnect 18, 20 also has a base 32 and an interconnection portion 34. Each base 32 has a minimum width D and slidably mates with the mold plate 14. Each interconnection portion 34 is further divided into a narrow section 36 and a broad section 38.

The narrow section 36 for each interconnect 18, 20 extends from the base 32 until it reaches the broad section 38. The broad section 38, which has a greater width than the narrow section 36, has a width W that is less than D. A representative sample of interconnects 18, 20 are shown in FIGS. 1 and 3. Obviously, the interconnects 18, 20 can be any shape other than those shown as long as one interconnect has a conventional female type connection and the other interconnect has a conventional male-type interconnect that mates with the female type connection.

As shown in FIG. 3, the male interconnect portion 34 protrudes downwards relatively from the side of the mold plate 14 that receives the polymeric material to form the structure 12 to a distance P. In contrast, the female interconnect portion 34 protrudes upwards relatively from the side of the mold plate 14 that receives the polymeric material to form the structure 12 to a distance P.

Each vertical gap filler 22 as shown in FIGS. 1, 2 and 3, aligns with the circular trench 16 and in particular the spacing between each interconnect 18, 20. The filler 22 has a foundation 40 and an extension 42. The foundation 40 is a minimum width D and mates with the mold plate 14. The extension 42 also has a height 88 at least equal to 2P, preferably greater than 2P. The height 88a that protrudes upwards relative to the side of the mold plate 14 that receives the polymeric material to form the structure 12 from its foundation 40 is at least equal to P, preferably greater than P. The extension 42 identified as 88a has a width G. The width G is equal to or less than D and greater than W. While the height 88b that protrudes downwards relative to the side of the mold plate 14 that receives the polymeric material to form the structure 12 from its foundation 40 is at least equal to P, preferably greater than P. The extension 42 identified as 88b has a width H. The width H is greater than W, and, in one embodiment, be greater than D as well. The length of each filler 22 is the distance between each interspaced interconnect 18, 20. Each filler 22 and interconnect 18, 20 moves due to the pneumatic cylinder 24.

The cylinder 24, i.e., a 4" bore, rotates each interconnect 18, 20 to a predetermined position and raises or lowers the vertical gap filler 22. In one embodiment, the cylinder 24 is powered pneumatically, by gas, electrically, or hydraulically.

Before any polymeric material is applied to the apparatus 10, the apparatus 10 must be prepared to receive it. To become prepared, the apparatus 10 must be set to a first position, as shown in FIG. 1. In FIG. 1, an operator, not shown, controls cylinder 24. The cylinder 24 rotates each interconnect 18, 20 to a predetermined position and then raises each vertical gap filler 22. The polymeric material, which can be any conventional polymeric material including foam, HDPE, LDPE in its conventional formable state, is applied to the apparatus 10 to form the polymeric structure 12. Once the polymeric structure 12 is formed in its conventional rigid state, the operator further controls the cylinder 24. As shown in FIG. 3, the cylinder 24 lowers the vertical gap filler until the extension 88a is below the side of the mold plate 14 that receives the polymeric material to form the structure 12 a distance greater than P and only then rotates each interconnect 18, 20 to the previous position of the fillers 22, thereby forming air gaps 66 in the circular trench 16. The polymeric structure 12 can then be removed from the apparatus 10 without destroying and/or damaging the interconnects 18a, 20a.

Alternatively, the apparatus 10 has, on the mold plate 14, a locking notch 77 and a mating notch 79 that forms corresponding locking mechanisms 77a, 79a on polymeric structure 12. These locking mechanisms 77a, 79a insure that mere horizontal and/or vertical forces will not separate connected polymeric structures 12, not shown.

Numerous variations will occur to those skilled in the art. It is intended therefore, that the foregoing descriptions be only illustrative of the present invention and that the present invention be limited only the hereinafter appended claims.

What is claimed is:

1. An apparatus that forms a polymeric structure, comprising:
    a mold plate of a predetermined geometric design;
    a circular trench in the mold plate, the difference between the outer diameter and the inner diameter of the circular trench is a distance D;
    a male interconnect and a female interconnect interspaced between each other, each interconnect rotates within the circular trench, each interconnect has a base and an interconnection portion, each base has a minimum width that is greater than or equal to the distance D and slidably mates to the mold plate, the male interconnect portion protrudes downwards relatively from the side of the mold plate that receives the polymeric material to a distance P, the female interconnect portion protrudes upwards relatively from the receiving side of the mold plate to the distance P;
    a vertical gap filler aligned with the circular trench, the filler has a foundation and an extension, the extension has a height at least equal to the distance 2P, and the extension protrudes upwards and downwards relatively from the receiving side of the mold plate from the foundation;
    a cylinder that rotates each interconnect to a predetermined position and raises the vertical gap filler so the foundation connects to the mold plate before any polymeric material is applied to the apparatus to form the polymeric structure, and once the polymeric structure is formed the pneumatic cylinder lowers the vertical gap filler until the extension is below the mold plate a distance greater than the distance P and rotates each interconnect so the polymeric structure can be removed from the apparatus.

2. The apparatus of claim 1 wherein the cylinder is pneumatic.

3. The apparatus of claim 1 wherein each interconnect is interspaced between 30 and 180 degrees.

4. The apparatus of claim 1 wherein the female interconnect portion of the polymeric structure receives the male interconnect portion of a second polymeric structure formed from the apparatus.

5. The apparatus of claim 1 wherein the polymeric structure is a three dimensional object, and the male and female interconnects are both on at least one side of the object.

6. The apparatus of claim 1 wherein the mold plate has a locking notch that corresponds with one interconnect and a mating notch that corresponds with the other interconnect.

7. The apparatus of claim 1 wherein the vertical gap filler has a length equal to the distance of the interspacing between each neighboring interconnect.

8. A method of using an apparatus that forms a polymeric structure, comprising the steps of:
    placing a formable polymeric material on: a mold plate of a predetermined geometric design; a circular trench in the mold plate, the difference between the outer diameter and the inner diameter of the circular trench is a distance D; a male interconnect and a female interconnect interspaced between each other, each interconnect rotates within the circular trench, each interconnect has a base and an interconnection portion, each base has a minimum width that is greater than or equal to the distance D and slidably mates to the mold plate, each interconnect portion has a width W which is less than the distance D, the male interconnect portion protrudes downwards relatively from the side of the mold plate that receives the polymeric material to a distance P, the female interconnect portion protrudes upwards relatively from the receiving side of the mold plate to [a] the distance P; and a vertical gap filler aligned with the circular trench, the filler has a foundation and an extension, the extension has a width greater than the width W, the extension has a height at least equal to the distance 2P, and the extension protrudes upwards and downwards relatively from the receiving side of the mold plate from the foundation, the foundation mates to the mold plate;
    lowering the vertical gap filler until the extension is below the mold plate a distance greater than the distance P;
    rotating each interconnect to the position previously occupied by the vertical gap filler; and
    removing the polymeric structure from the apparatus.

9. The method of claim 8 wherein a cylinder lowers the vertical gap filler.

10. The method of claim 8 wherein each interconnect is interspaced between 30 and 180 degrees.

11. The method of claim 8 wherein the female interconnect portion of the polymeric structure receives the male interconnect portion of a second polymeric structure formed from the apparatus.

12. The method of claim 8 wherein the polymeric structure is a three dimensional object, and the male and female interconnects are both on at least one side of the object.

13. The method of claim 8 wherein the mold plate has a locking notch that corresponds with one interconnect and a mating notch that corresponds with the other interconnect.

14. The method of claim 8 wherein the vertical gap filler has a length equal to the distance of the interspacing between each neighboring interconnect.

15. The method of claim 8 wherein a cylinder rotates each interconnect.

16. The method of claim 15 wherein the cylinder is pneumatic.

* * * * *